(12) United States Patent
Granz et al.

(10) Patent No.: US 9,916,847 B1
(45) Date of Patent: Mar. 13, 2018

(54) MAGNETIC RECORDING DEVICE CAPABLE OF DETECTING CONTAMINATION BUILDUP AT A HEAD-DISK INTERFACE

(71) Applicant: Seagate Technology LLC, Cupertino, CA (US)

(72) Inventors: Steven Douglas Granz, Shakopee, MN (US); Michael Thomas Johnson, Minneapolis, MN (US); Patrick Carl Fletcher, Minnetonka, MN (US); Manuel Charles Anaya-Dufresne, Edina, MN (US); Peng Peng, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/153,103

(22) Filed: May 12, 2016

Related U.S. Application Data

(60) Provisional application No. 62/170,975, filed on Jun. 4, 2015.

(51) Int. Cl.
| | |
|---|---|
| *G11B 11/00* | (2006.01) |
| *G11B 5/455* | (2006.01) |
| *G11B 5/00* | (2006.01) |
| *G11B 7/1263* | (2012.01) |
| *G11B 11/105* | (2006.01) |
| *G11B 5/60* | (2006.01) |

(Continued)

(52) U.S. Cl.
CPC ............ *G11B 5/455* (2013.01); *G11B 5/6088* (2013.01); *G11B 7/126* (2013.01); *G11B 7/1263* (2013.01); *G11B 7/1267* (2013.01); *G11B 11/1051* (2013.01); *G11B 11/10506* (2013.01); *G11B 2005/0021* (2013.01)

(58) Field of Classification Search
USPC .......................................................... 360/59
See application file for complete search history.

(56) References Cited

U.S. PATENT DOCUMENTS

| | | |
|---|---|---|
| 5,396,476 A | 3/1995 | Asthana |
| 6,583,959 B1 | 6/2003 | Hall |

(Continued)

OTHER PUBLICATIONS

Zhang et al."Predicting Air Bearing Contamination Using Air Flow Pattern Analysis", Journal of Tribology, Jan. 2008, 011002-1-011002-4.

(Continued)

*Primary Examiner* — Tan X Dinh
(74) *Attorney, Agent, or Firm* — Hollingsworth Davis, LLC

(57) ABSTRACT

An apparatus comprises a thermal sensor configured to interact with a magnetic recording disk. A head-disk interface is defined between the thermal sensor and the disk. A power supply is coupled to the thermal sensor and configured to supply a bias power to the thermal sensor between a low power and a high power. A processor is coupled to the thermal sensor and configured to determine a slope of a resistance response of the thermal sensor. The processor is further configured to detect a change in the slope relative to a baseline slope. The slope change indicates increased heat sinking between the thermal sensor and the disk due to the presence of contaminant buildup at the head-disk interface.

22 Claims, 13 Drawing Sheets

(51) Int. Cl.
    *G11B 7/1267* (2012.01)
    *G11B 7/126* (2012.01)

(56) References Cited

U.S. PATENT DOCUMENTS

| | | |
|---|---|---|
| 6,624,958 B1 | 9/2003 | Alva |
| 7,450,343 B2 | 11/2008 | Huang |
| 7,715,135 B1 | 5/2010 | Sutardja et al. |
| 8,593,753 B1 | 11/2013 | Anderson |
| 8,665,546 B1 * | 3/2014 | Zhao .................. G11B 5/607 360/55 |
| 8,873,191 B2 | 10/2014 | Li et al. |
| 8,929,008 B1 | 1/2015 | O'Dell et al. |
| 8,995,078 B1 | 3/2015 | Setuwanto et al. |
| 2003/0202273 A1 * | 10/2003 | Smith .................. G11B 5/41 360/69 |
| 2006/0044658 A1 | 3/2006 | Ma |
| 2006/0092543 A1 * | 5/2006 | Che .................. G11B 33/1493 360/60 |
| 2008/0239581 A1 | 10/2008 | Ikai et al. |
| 2009/0168268 A1 | 7/2009 | Druist et al. |
| 2011/0235207 A1 | 9/2011 | Yang |
| 2012/0120521 A1 | 5/2012 | Kurita et al. |
| 2015/0085632 A1 * | 3/2015 | Kiely .................. G11B 5/41 369/53.38 |
| 2016/0093320 A1 * | 3/2016 | Aria .................. G11B 5/455 369/53.38 |

OTHER PUBLICATIONS

File History for U.S. Appl. No. 14/037,139.

\* cited by examiner

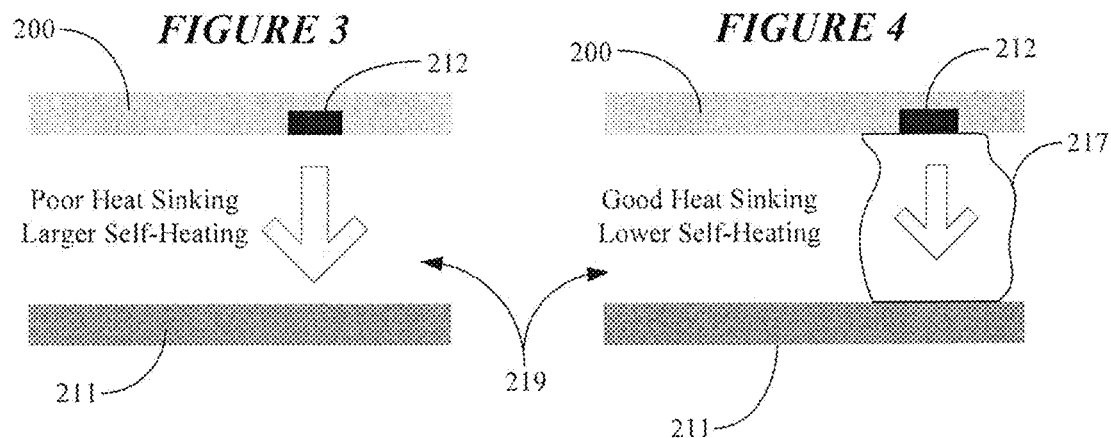
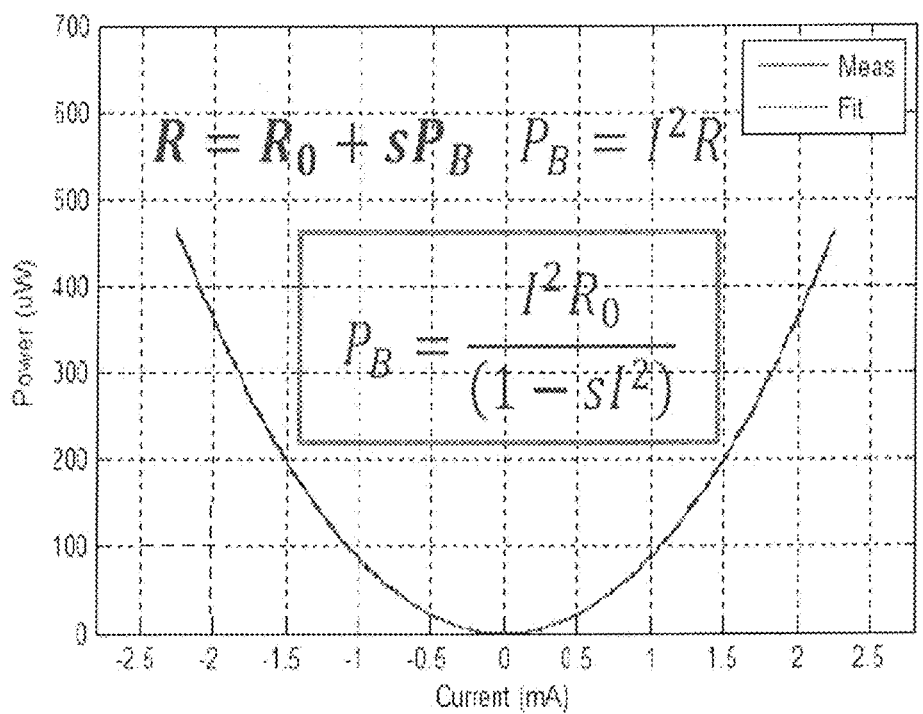

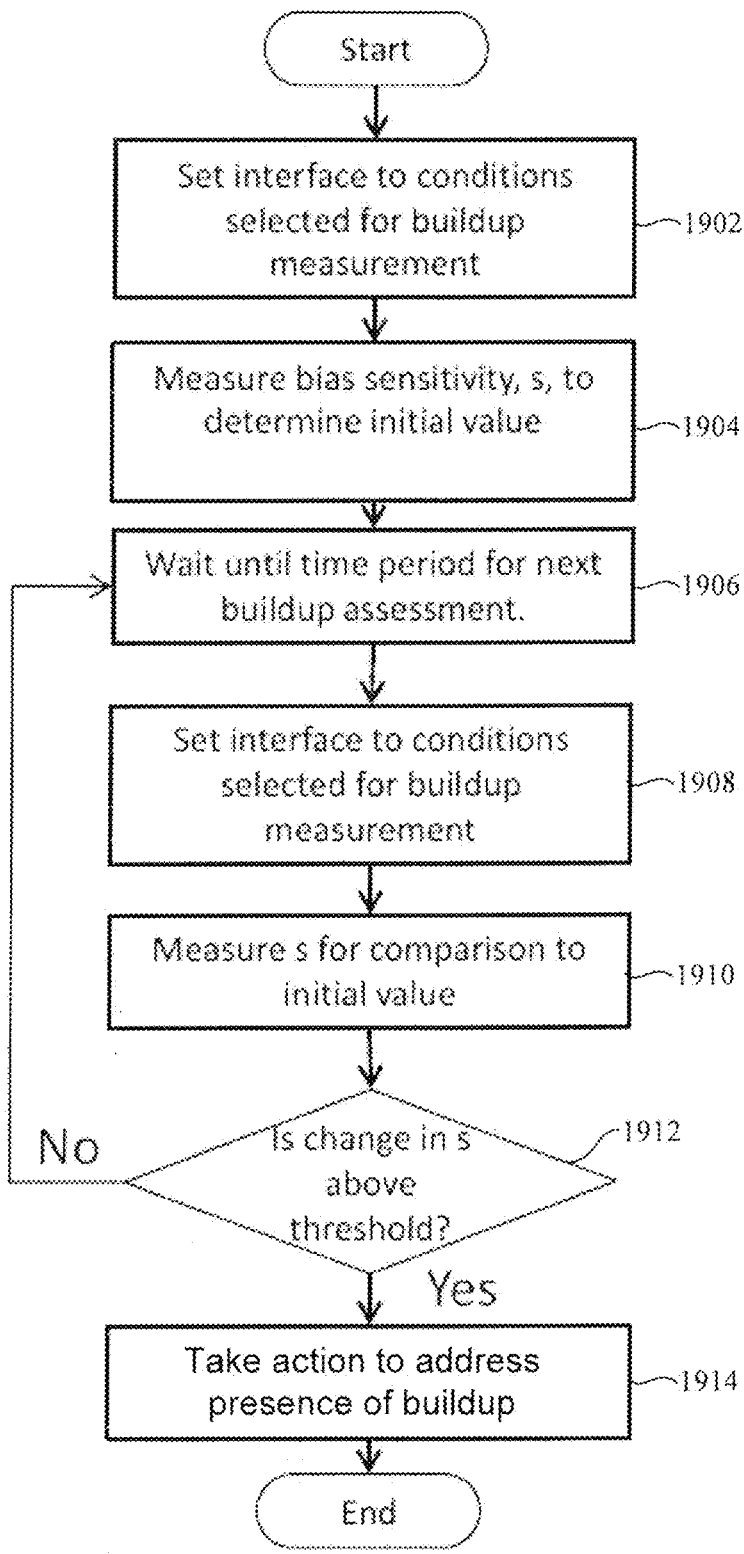

MAGNETIC RECORDING DEVICE CAPABLE OF DETECTING CONTAMINATION BUILDUP AT A HEAD-DISK INTERFACE

RELATED PATENT DOCUMENTS

This application claims the benefit of Provisional Patent Application Ser. No. 62/170,975 filed on Jun. 4, 2015, to which priority is claimed pursuant to 35 U.S.C. § 119(e), and which is incorporated herein by reference in its entirety.

SUMMARY

Embodiments of the disclosure are directed to an apparatus comprising a thermal sensor configured to interact with a magnetic recording disk. A head-disk interface is defined between the thermal sensor and the disk. A power supply is coupled to the thermal sensor and configured to supply a bias power to the thermal sensor between a low power and a high power. A processor is coupled to the thermal sensor and configured to determine a slope of a resistance response of the thermal sensor. The processor is further configured to detect a change in the slope relative to a baseline slope. The slope change indicates increased heat sinking between the thermal sensor and the disk due to the presence of contaminant buildup at the head-disk interface.

Other embodiments are directed to a method that involves providing relative movement between a magnetic recording disk and a thermal sensor. A head-disk interface is defined between the disk and the thermal sensor. The method also involves supplying a bias power to the thermal sensor between a low power and a high power. The method further involves determining a slope of a resistance response of the thermal sensor, and detecting presence of contaminant buildup at the head-disk interface using a change in the slope relative to a baseline slope.

The above summary is not intended to describe each disclosed embodiment or every implementation of the present disclosure. The figures and the detailed description below more particularly exemplify illustrative embodiments.

BRIEF DESCRIPTION OF THE DRAWINGS

FIG. 3 shows a head-disk interface devoid of contaminants;

FIG. 4 shows a head-disk interface that includes contaminant buildup, which can be detected and monitored in accordance with embodiments of the disclosure;

FIG. 8 illustrates an alternative approach to calculating the bias sensitivity, s, of a thermal sensor in accordance with various embodiments;

FIG. 19 is a flow diagram of a test procedure for detecting contaminant buildup at a head-disk interface in accordance with various embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
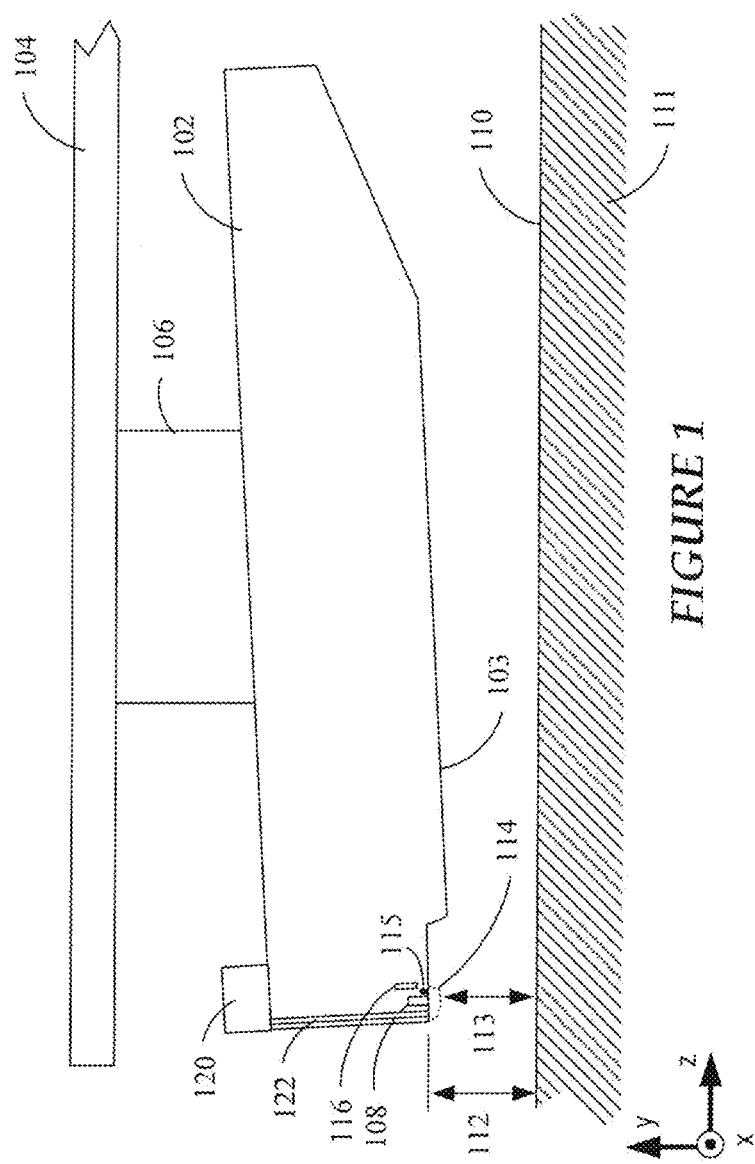
FIG. 1 is a schematic representation of a slider in which the various embodiments disclosed herein may be implemented.

Monitoring accumulation and contamination on the air bearing surface (ABS) of a recording head is an important technique needed to predict performance and reliability of recording heads, particularly those designed for heat-assisted magnetic recording (HAMR), also referred to as energy-assisted magnetic recording (EAMR), thermally-assisted magnetic recording (TAMR), and thermally-assisted recording (TAR). Foreign material in the interface between the recording head and the magnetic recording medium (i.e., head-disk interface or HDI) can affect, or be an indicator of, the performance and reliability of a head-disk interface. This buildup or accumulation can increase over time and change the clearance of the head or lead to instabilities in the interface. In particular for HAMR devices, the high temperatures required in the head-disk interface cause material to build up which can affect the long term performance of the HAMR head-disk interface.

Presently, accumulation and contamination assessment is done separately from spin stand and drive, and not as a real-time sensor during testing at the component or drive level. Detecting accumulation and contamination during component testing or in-drive is important to ensure head performance and reliability to potentially predict head failure due to long term buildup and head-disk interface events.

The present disclosure generally relates to detecting contaminant buildup at a head-disk interface between a recording head and a magnetic recording medium. Various embodiments are directed to detecting contaminant buildup at a head-disk interface for conventional recording technologies, while other embodiments are directed to use in HAMR technologies. Some embodiments are directed to a direct current (DC) technique, while other embodiments are directed to an alternating current (AC) technique.

According to various embodiments, a technique for detecting contaminant buildup at a head-disk interface involves providing relative movement between a magnetic recording medium and a thermal sensor of a transducer, and supplying a bias power to the thermal sensor between a low power and a high power. The technique also involves determining a slope of a resistance response of the thermal sensor, and detecting presence of contaminant buildup at a head-disk interface using a change in the slope relative to a baseline slope. For example, a detected decrease in the slope relative to the baseline indicates increased heat sinking between the thermal sensor and the medium due to the presence of contaminant buildup at the head-disk interface. In some embodiments, the bias power supplied to the thermal sensor is a DC bias power. In other embodiments, the bias power supplied to the thermal sensor is an AC bias power having predetermined frequency.

In accordance with other embodiments, an apparatus for detecting contaminant buildup at a head-disk interface includes a transducer comprising a thermal sensor configured to interact with a magnetic recording medium. A head-disk interface is defined between the thermal sensor and the medium. A power supply is coupled to the thermal sensor and configured to supply a bias power to the thermal sensor between a low power and a high power. A processor is coupled to the thermal sensor and configured to determine a slope of a resistance response of the thermal sensor. This slope is a measure of bias sensitivity of the thermal sensor. The processor is further configured to detect a change in the slope relative to a baseline slope. The detected slope change, such as a decrease in the slope relative to a baseline, indicates increased heat sinking between the thermal sensor and the medium due to the presence of contaminant buildup at the head-disk interface. In some embodiments, the bias power supplied to the thermal sensor is a DC bias power, while in in other embodiments the bias power supplied to the thermal sensor is an AC bias power having predetermined frequency.

The resistance increase per applied bias power to the thermal sensor is smaller for a head-disk interface with better heat sinking away from the thermal sensor. This change in heat sinking can be correlated to changes in the head-disk interface. In general, contaminant buildup in the head-disk interface will cause an increase in the heat sinking and generate a response in the bias sensitivity of the thermal sensor.

In general, the sensor used to assess the thermal conduction at the head-disk interface is positioned near the location of expected contaminant buildup. Typical thermal sensors are on the ABS where changes in the local heat sinking to the disk are strongest. The exact location of the thermal sensor depends on the details of the head design. The thermal sensor can be either a dedicated sensor or reuse of an existing element in the head, as long as the measured signal is proportional to the resistance change of the sensor. In order to improve the signal of the thermal sensor, a heat source can be used to increase the fidelity of the thermal sensor signal by warming the head. In a HAMR head, the buildup location is expected to be near the focus of light in the head where the temperature is highest. For HAMR head-disk interfaces, the location of expected buildup is generally downtrack towards the trailing edge of the slider from the NFT and write pole. It is to be understood that the disclosed methodologies are applicable to any source of buildup or contamination in the head-disk interface and not limited to laser-induced buildup in HAMR heads. It is appreciated that different head locations may be implicated to detect buildup from different sources for both HAMR and PMR (perpendicular magnetic recording) heads.

According to some embodiments, a DC biased thermal sensor is disposed on a head (e.g., recording head or a tester head) and configured to detect and monitor contaminant buildup on the air bearing surface of the head. Changes in the resistance of the thermal sensor are used to detect and monitor accumulation and contamination of the ABS of the head. The thermal sensor can be a dedicated element or can also perform other functions, such as head-disk spacing and contact detection. The thermal sensor can be used for monitoring accumulation and contamination during real-time testing during component testing on a spin stand or in-drive during the lifetime of the product. The resistance signal generated by the thermal sensor can be measured by several methods, including sweeping the DC bias of the thermal sensor and observing a decrease in resistance due to changing in heating sinking of the sensor which has been shown to correlate to accumulation on the sensor. The bias sensitivity of the thermal sensor can be measured by several methods including using multiple point measurement of the DC resistance or a bias sweep and using either a linear fit of resistance vs. bias power or a fit of power vs. voltage, for example. Different resistance measurement approaches can be selected to enhance (e.g., optimize) the signal response for a given head design. The thermal sensor can be located at head locations where accumulation and contamination occur and or is of interest in being detected and monitored.

According to other embodiments, an AC biased thermal sensor is disposed on a head (e.g., recording head or a tester head) and configured to detect and monitor contaminant buildup on the ABS of the head. An AC biasing approach can involve oscillating the thermal sensor bias using an AC wave form and using phase detection techniques to detect the bias sensitivity. For this method, an oscillating bias voltage or current is applied to the thermal sensor at a known frequency. A phase sensitive detector, such as a lock-in amplifier, is used to determine the current and voltage changes from which the applied power and resistance changes can be determined. Because the response of the thermal sensor resistance to a bias change is very fast when employing an AC biasing methodology, the thermal sensor bias can be oscillated or swept at frequencies up to about 500 kHz, allowing changes on small time scales to be assessed.

Referring now to FIG. 1, a block diagram shows a side view of a read/write transducer 102 according to a representative embodiment. The read/write transducer 102 may be used in a magnetic data storage device, e.g., a hard disk drive. The read/write transducer 102 may also be referred to herein as a slider, read head, recording head, etc. The read/write transducer 102 is coupled to an arm 104 by way of a suspension 106 that allows some relative motion between the read/write transducer 102 and arm 104. The read/write transducer 102 includes read/write transducers 108 at a trailing edge that are held proximate to a surface 110 of a magnetic recording medium 111, e.g., magnetic disk. The read/write transducer 102 shown in FIG. 1 is configured as a HAMR recording head, which includes a laser 120 (or other energy source) and a waveguide 122. The waveguide 122 delivers light from the laser 120 to components (e.g., a near-field transducer) near the read/write transducers 108. It is understood that embodiments of the disclosure can be implemented in conventional head configurations, and are not limited to HAMR devices.

When the read/write transducer 102 is located over surface 110 of recording medium 111, a flying height 112 is maintained between the read/write transducer 102 and the surface 110 by a downward force of arm 104. This downward force is counterbalanced by an air cushion that exists between the surface 110 and an air bearing surface 103 (also referred to herein as a "media-facing surface") of the read/write transducer 102 when the recording medium 111 is rotating. It is desirable to maintain a predetermined slider flying height 112 over a range of disk rotational speeds during both reading and writing operations to ensure consistent performance. Region 114 is a "close point" of the read/write transducer 102, which is generally understood to be the closest spacing between the read/write transducers 108 and the magnetic recording medium 111, and generally defines the head-to-medium spacing 113. To account for both static and dynamic variations that may affect slider flying height 112, the read/write transducer 102 may be configured such that a region 114 of the read/write transducer 102 can be configurably adjusted during operation in order to finely adjust the head-to-medium spacing 113. This is shown in FIG. 1 by a dotted line that represents a change in geometry of the region 114. In this example, the geometry change may be induced, in whole or in part, by an increase or decrease in temperature of the region 114 via a heater 116. A thermal sensor 115 is shown situated at or near the close point 114 (e.g., adjacent the read/write transducers 108, such as near the near-field transducer) or can be positioned at other location of the ABS 103 where contaminant buildup is likely to occur.

Figure 2:
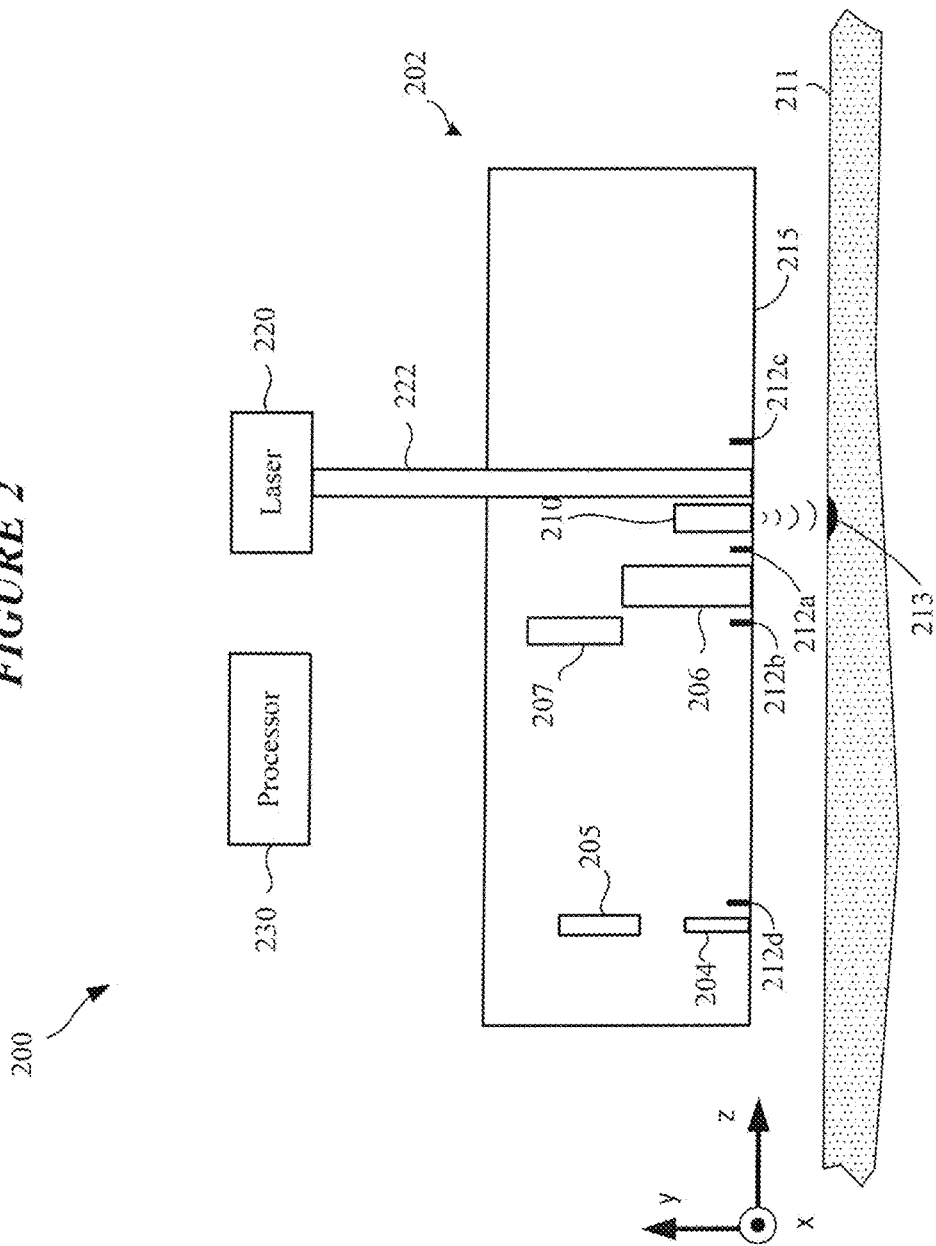
FIG. 2 shows a recording head arrangement in accordance with various embodiments.

FIG. 2 shows a recording head arrangement 200 in accordance with various embodiments. More particularly, the recording head arrangement 200 is configured as a HAMR device. The recording head arrangement 200 includes a slider 202 positioned proximate a rotating magnetic medium 211. The slider 202 includes a reader 204 and a writer 206 proximate the ABS 215 for respectively reading and writing data from/to the magnetic medium 211. The writer 206 is located adjacent a near-field transducer (NFT) 210 which is optically coupled to a light source 220 (e.g., laser diode) via a waveguide 222. The light source 220 can be mounted external, or integral, to the slider 202. The light source 220 energizes the NFT 210 via the waveguide 222. The writer 206 includes a corresponding heater 207, and the reader 204 includes a corresponding heater 205 according to various embodiments. The writer heater 207 can be powered to cause protrusion of the ABS 215 predominately in the ABS region at or proximate the writer 206, and the reader heater 205 can be powered to cause protrusion of the ABS 215 predominately in the ABS region at or proximate the reader 204. Power can be controllably delivered independently to the heaters 207 and 205 to adjust the fly height (e.g., clearance) of the slider 202 relative to the surface of the recording medium 211.

FIG. 2 further shows a thermal sensor 212 situated at various locations on the slider 202 at or near the ABS 215. In some embodiments, a thermal sensor 212a can be situated adjacent the NFT 210 (e.g., between the NFT 210 and the write pole of the writer 206). In some embodiments, the thermal sensor 212a can be located between about 2 and 5 µm from the NFT 210 (or the laser focus location), such as between about 2 and 3 µm. In other embodiments, the thermal sensor 212a can be located as much as about 10 µm from the NFT 210 or the laser focus location, it being understood that detecting contaminant build-up will take longer the further away the thermal sensor 212a is situated relative to the NFT 210/laser focus location.

In other embodiments, a thermal sensor 212b can be situated adjacent the write pole of the writer 206 on the side opposite that nearest the NFT 210. In further embodiments, a thermal sensor 212c can be situated adjacent the waveguide 222 on the side opposite that nearest the NFT 210. Yet in other embodiments, a thermal sensor 212d can be situated adjacent the reader 204. It is understood that a single or multiple thermal sensors 212 may be provided/distributed on the slider 202. The thermal sensor 212 can have a width of between about 0.5 and 10 µm, such as about 1.5 µm. It is further understood that the thermal sensors can be implemented in a variety of technologies, such as resistance thermal sensors, thermistors, and thermocouples, for example. Certain embodiments disclosed herein are directed to sensors having a temperature coefficient of resistance (referred to herein as TCR sensors), it being understood that other forms and/or means of sensing temperature are considered as being within the metes and bounds of the instant disclosure.

Some of the TCR sensors described herein are referred to as Dual-ended Thermal Coefficient of Resistance (DETCR) sensors. A DETCR sensor is configured to operate with each of its two electrical contacts (i.e., ends) connected to respective bias sources provided by a pair of electrical bond pads of the slider 202. Another example of a TCR sensor is a ground-split (GS) temperature coefficient of resistance sensor, in which one end of the GSTCR is coupled to ground and the other is coupled to a bias source via an electrical bond pad of the slider 202.

A HAMR device utilizes the types of optical devices described above to heat a magnetic recording media (e.g., hard disk) in order to overcome superparamagnetic effects that limit the areal data density of typical magnetic media. When writing with a HAMR device, the electromagnetic energy (e.g., laser or light) is concentrated onto a small hotspot 213 over the track of the magnetic medium 211 where writing takes place, as shown in FIG. 2. The light from the source 220 propagates to the NFT 210, e.g., either directly from the source 220 or through the mode converter or by way of a focusing element. Other optical elements, such as couplers, mirrors, prisms, etc., may also be formed integral to the slider.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 213 is on the order of 50 nm or less. Thus, the desired hot spot size is well below half the wavelength of the light. Optical focusers cannot be used to obtain the desired hot spot size, being diffraction limited at this scale. As a result, the NFT 210 is employed to create a hotspot on the media.

The NFT 210 is a near-field optics device configured to generate local surface plasmon resonance at a designated (e.g., design) wavelength. The NFT 210 is generally formed from a thin film of plasmonic material (e.g., gold, silver, copper) on a substrate. In a HAMR slider 202, the NFT 210 is positioned proximate the write pole of the writer 206. The NFT 210 is aligned with the plane of the ABS 215 parallel to the read/write surface of the magnetic medium 211. The NFT 210 achieves surface plasmon resonance in response to the incident electromagnetic energy. The plasmons generated by this resonance are emitted from the NFT 210 towards the magnetic medium 211 where they are absorbed to create the hotspot 213. At resonance, a high electric field surrounds the NFT 210 due to the collective oscillations of electrons at the metal surface (e.g., substrate) of the magnetic medium 211. At least a portion of the electric field surrounding the NFT 210 tunnels into, and gets absorbed by, the magnetic medium 211, thereby raising the temperature of the spot 213 on the medium 211 as data is being recorded.

The writing process implemented by a HAMR device generates high temperatures at the ABS 215 proximate the NFT 210 and writer 206, as well as the hotspot 213 on the magnetic medium 211. The elevated temperatures associated with HAMR device operation results in thermochemical reactions between the recording head arrangement 200 and the magnetic medium 211. For example, elevated temperatures at the head-disk interface result in an increase of contaminants from a variety of sources, including the lubrication that coats the magnetic medium 211. Globules of lubrication and other contaminants can form at the head-disk interface, which tend to accumulate at or near locations of elevated temperature (e.g., at and near the NFT 210) and close points of the slider 202. Other contaminants that tend to accumulate at the head-disk interface include silica, iron, iron-platinum, nickel, asperities, and other materials that are used to fabricate the magnetic medium. Dust and other ambient debris can also accumulate at the head-disk interface.

The accumulation of contaminants at the head-disk interface causes the formation of a coalescence of material between the head 202 and the magnetic medium 211, which undesirably alters the thermal environment at the head-disk interface. It is understood in the art that the head-disk interface of a HAMR device is engineered to be a tightly controlled optical and thermal environment, which can be disturbed by the introduction of contaminants. In short, the accumulation of contaminants at the head-disk interface alters the heat sinking condition between the head 200 and the magnetic medium 211. For example, contaminant buildup at the head-disk interface can result in back heating of the head 200, which is caused by heat produced at the hotspot 213 traveling from the magnetic medium 211 back to the head 200 via a thermal bridge formed from coalesced contaminants. This and other perturbations in the thermal environment caused by contaminant buildup at the head-disk interface can alter properties of the tightly engineer optical path of a HAMR head 200, thereby adversely impacting the head 200 during write operations in particular.

FIG. 3 illustrates a head 200 spaced apart from, and in proximity with, a magnetic medium or disk 211. The head 200 is shown to include a thermal sensor 212 situated in proximity to a head-disk interface 219 defined between the head 200 and the disk 211. In FIG. 3, the head-disk interface 219 is substantially devoid of contaminant build up. From a heat transfer point of view, a head-disk interface 219 substantially free of contaminant buildup results in relatively poor heat sinking between the head 200 and the disk 211. The lack of contaminant accumulation on the thermal sensor 212 results in a greater degree of self-heating, for the same bias power, in comparison to a thermal sensor 212 covered with contamination. FIG. 4 shows buildup of contaminants 217 at the head-disk interface 219. The accumulation of contaminants 217 provides a thermal path between the head 212 and the disk 211. The presence of contaminant buildup 217 at the head-disk interface 219 results in good heat sinking between the head 200 and the disk 211. Accumulation of contaminants on the thermal sensor 212 results in reduced self-heating due to increased thermal conduction between the thermal sensor 212 and the contaminant buildup 217.

Figure 5:
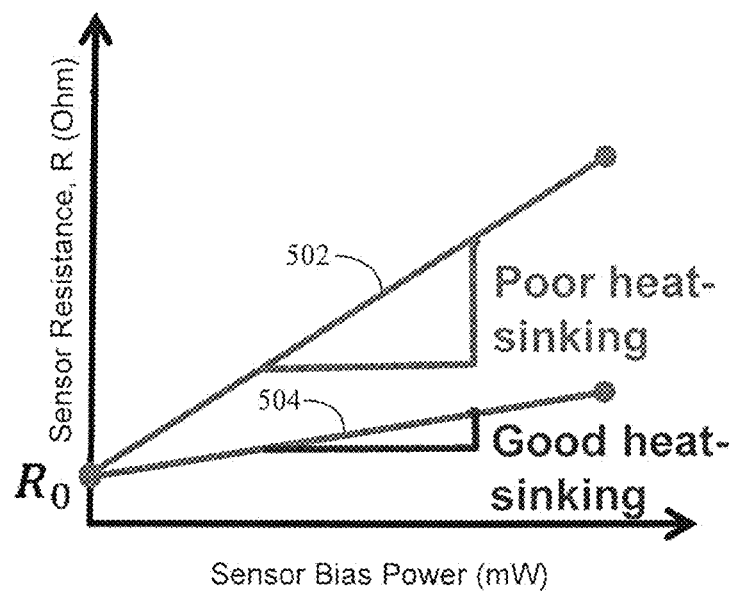
FIG. 5 illustrates a heat sinking phenomenon at a head-disk interface in the absence and presence of contaminant buildup in accordance with various embodiment.

FIG. 5 illustrates the heat sinking phenomenon within the head-disk interface in the absence and presence of contaminant buildup in accordance with various embodiments. FIG. 5 shows two plots 502 and 504 of sensor resistance, R (Ohm) as a function of sensor bias power (mW). Plot 502 represents a scenario in which the head-disk interface is substantially devoid of contaminant buildup, resulting in relatively poor heat sinking between the head and the disk. Plot 504, in contrast, represents a scenario in which the head-disk interface contains contaminant buildup, resulting in relatively good heat sinking between the head and the disk. As can be seen in FIG. 5, plots 502 and 504 have different slopes. The slopes of the plots 502 and 504 represent bias sensitivity of the thermal sensor, which provides an indication of the amount of contaminant accumulation within the head-disk interface. As can be seen in FIG. 5, each of the two plots 502 and 504 originate at a common point on the y-axis, designated $R_0$. $R_0$ represents the value of sensor resistance, R, at zero bias power, which is an extrapolated value. It is noted that the value of sensor resistance, R, is given by the equation $R=R_0+sP_B$, where $R_0$ is sensor resistance at zero bias power, s is bias sensitivity (slope), and $P_B$ is bias power.

Figure 6:
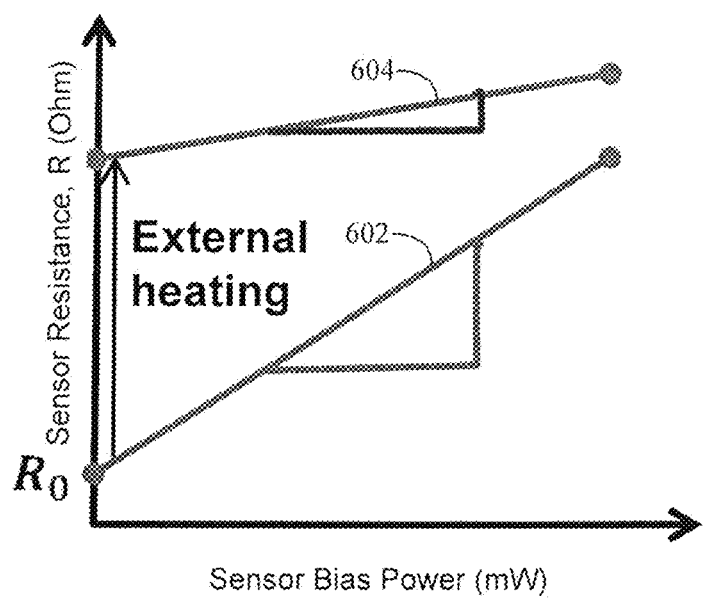
FIG. 6 illustrates a scenario similar to that depicted in FIG. 5, and additionally shows a change in thermal sensor resistance, $R_0$, due to external heating or sensor malfunction in accordance with various embodiments.

FIG. 6 illustrates a scenario similar to that depicted in FIG. 5, with plot 602 indicating relatively poor heat sinking and plot 604 indicating relatively good heat sinking between the head and the disk. FIG. 6 differs from that of FIG. 5 in that the resistance $R_0$ is different for each of the two plots 602 and 604. More particularly, the value of $R_0$ for plot 604 is translated upwards on the y-axis relative to $R_0$ for plot 602. This translation or difference in the value of $R_0$ for the two plots 602 and 604 results from differences in external heating or condition of the thermal sensor. An appreciable difference between the value of $R_0$ in the two plots 602 and 604 indicates that the thermal environment or operational status of the thermal sensor has changed appreciably for reasons other than a change in the contaminant buildup at the head-disk interface. Such other reasons can include a change in the ambient temperature of the head or a malfunction of the thermal sensor. A detected change in $R_0$, such as is shown in FIG. 6, can result in an alert signal being generated to call attention to the changed condition of the thermal sensor. Corrective action may then be carried out in response to the alert signal.

Figure 7:
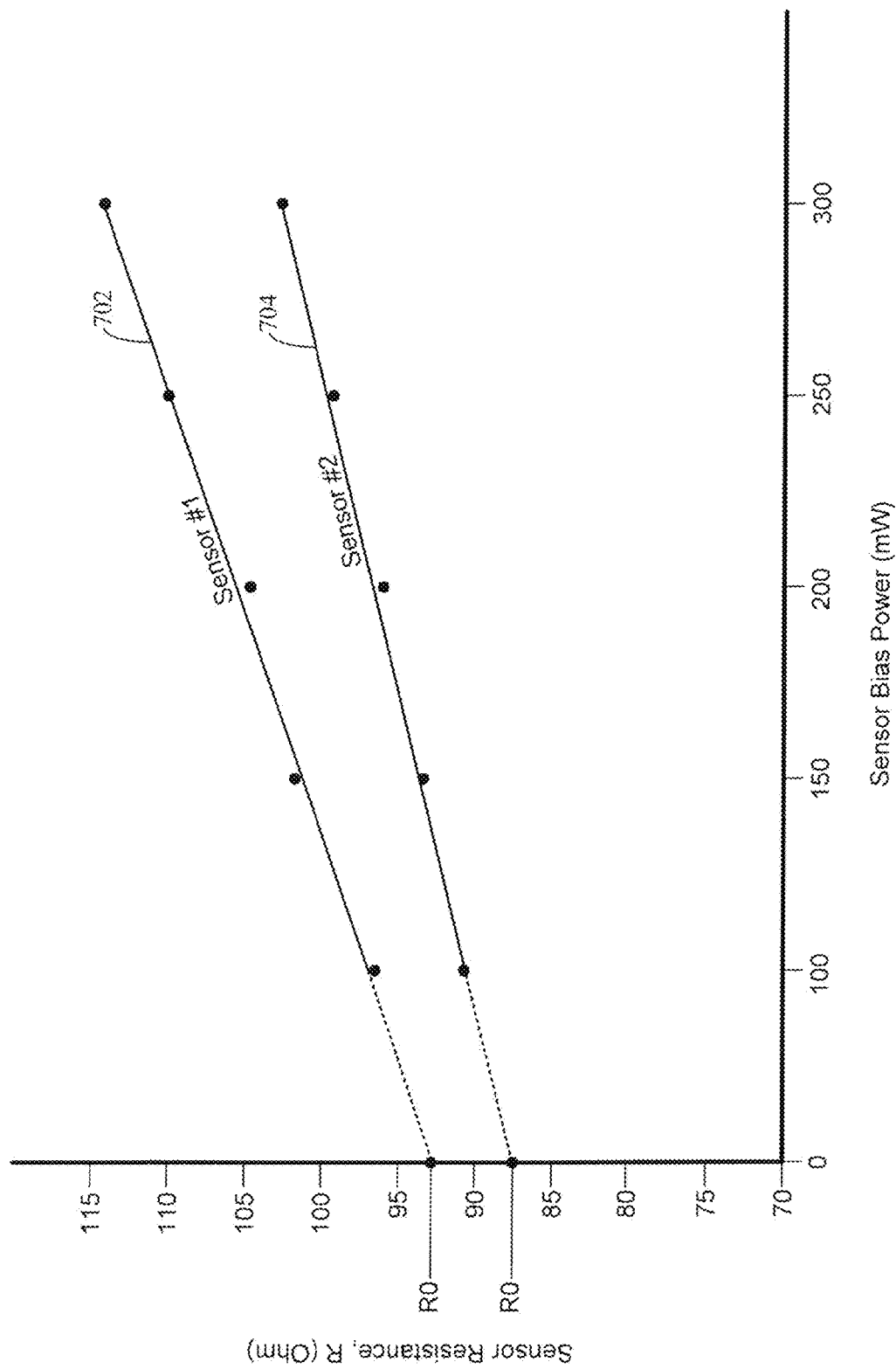
FIG. 7 illustrates how the value of sensor resistance, $R_0$, can be calculated for a thermal sensor in accordance with various embodiments.

FIG. 7 illustrates how the value of $R_0$ can be calculated for a thermal sensor in accordance with various embodiments. FIG. 7 illustrates two plots 702 and 704 developed from resistance, R, measurements for two different thermal sensors. Each of the two thermal sensors has a different value of $R_0$. Plots 702 and 704 can be obtained by sweeping the bias power between a low value (e.g., 0 mW) and a high-value (e.g., 350 mW). As the sensor bias power is swept, the sensor resistance, R, is measured at various power levels. In the example shown in FIG. 7, resistance measurements for each of the two sensors is taken at 50 mW intervals. A linear fit of the data is performed to calculate the bias sensitivity, s, represented by the slope of each of the two plots 702 and 704. Using the linear fit of resistance measurements for each plot 702 and 704, the value of $R_0$ is extrapolated for a condition of zero bias power. The value of $R_0$ and the slope (baseline) of each plot 702 and 704 can be stored for future reference. The baseline slopes of plots 702 and 704 can be compared to later-developed slopes to detect the presence and magnitude of contaminant accumulation at the head-disk interface.

FIG. 8 illustrates an alternative approach to calculating the bias sensitivity, s. The data of FIG. 8 illustrates the measured bias power, $P_B$ (μW), as a function of bias current, I (mA). In the context of FIG. 8, the value of sensor resistance, R, is given by the equation $R=R_0+sP_B$, where $R_0$ is sensor resistance at zero bias power, s is bias sensitivity (slope), and $P_B$ is bias power given as $P_B=I^2R$, where:

$$P_B = \frac{I^2 R_0}{(1-sI^2)}.$$

Figure 10:
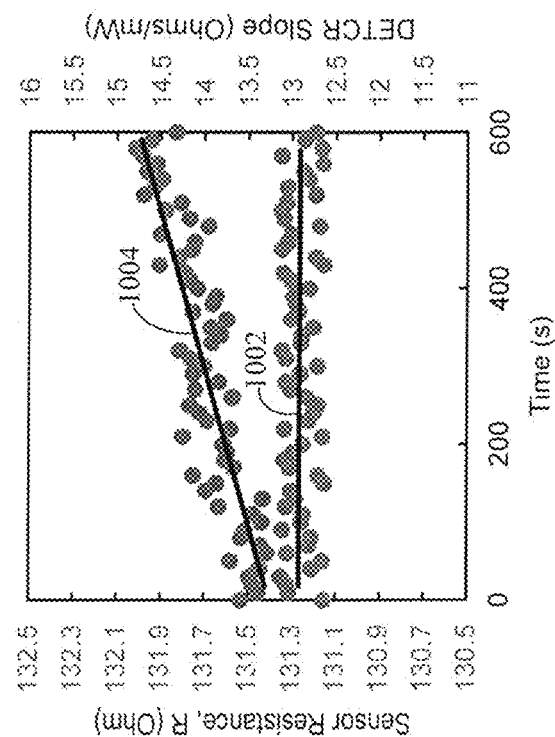
FIG. 10 illustrates the resistance of thermal sensor measured over time in the presence of contaminant accumulation at the head-disk interface according to various embodiments.
Figure 9:
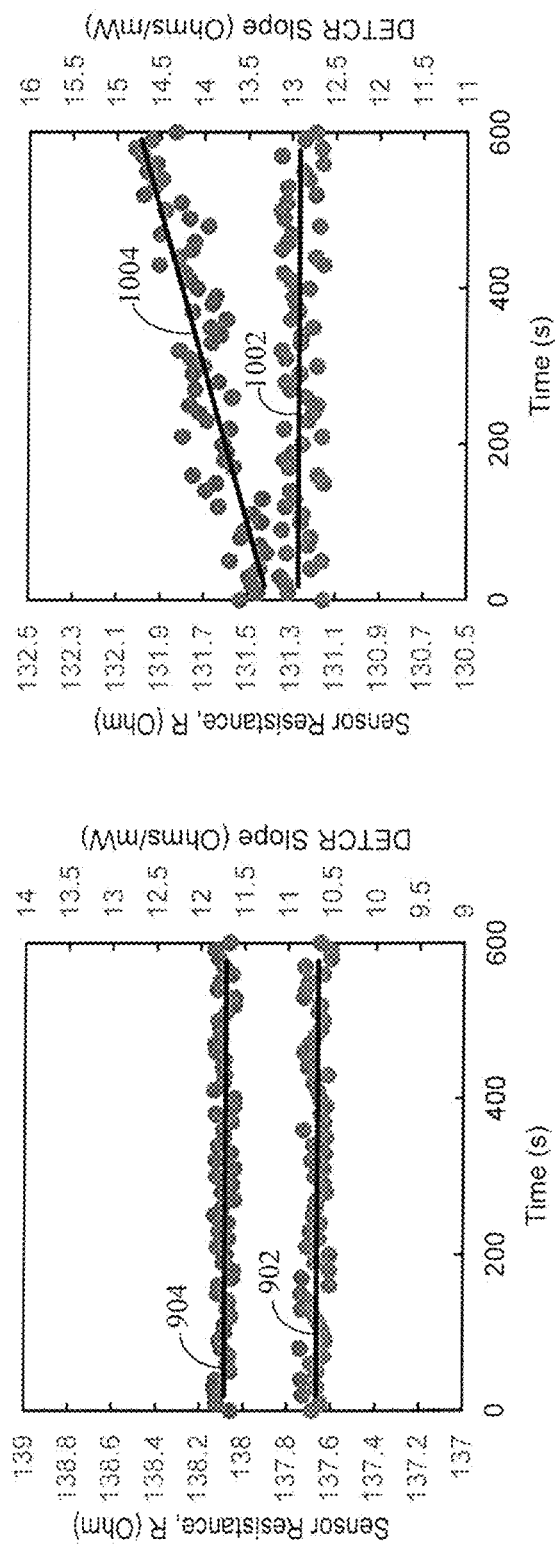
FIG. 9 illustrates the resistance of a thermal sensor measured over time in the absence of contaminant accumulation at the head-disk interface according to various embodiments.

FIG. 9 illustrates the resistance of two thermal sensors from different heads measured over time in the absence of contaminant accumulation at the head-disk interfaces of the two sensors. FIG. 10 illustrates the resistance of two thermal sensors from different heads measured over time with content accumulation at the head-disk interface of one of the two sensors. As can be seen in FIG. 9, the sensor resistance, R, for plots 902 and 904 remains substantially stable over time, indicating no change in buildup accumulation or contamination over the thermal sensors. Plots 902 and 904 differ in terms of the value of $R_0$, due to each sensor's response to local temperature and/or slight geometric differences in the two temperature sensors. FIG. 10, in contrast, shows differences in bias sensitivity (slope) for two sensors, one sensor without contaminant accumulation at the head-disk interface (plot 1002) and the other sensor with contaminant accumulation at the head-disk interface (plot 1004). The positive slope of curve/line 1004 is indicative of contaminant buildup at the head-disk interface. The magnitude of the difference between the slope of line/curve 1004 and some pre-established baseline sensor resistance, R, is indicative of the magnitude of the contaminant buildup.

Figure 11:
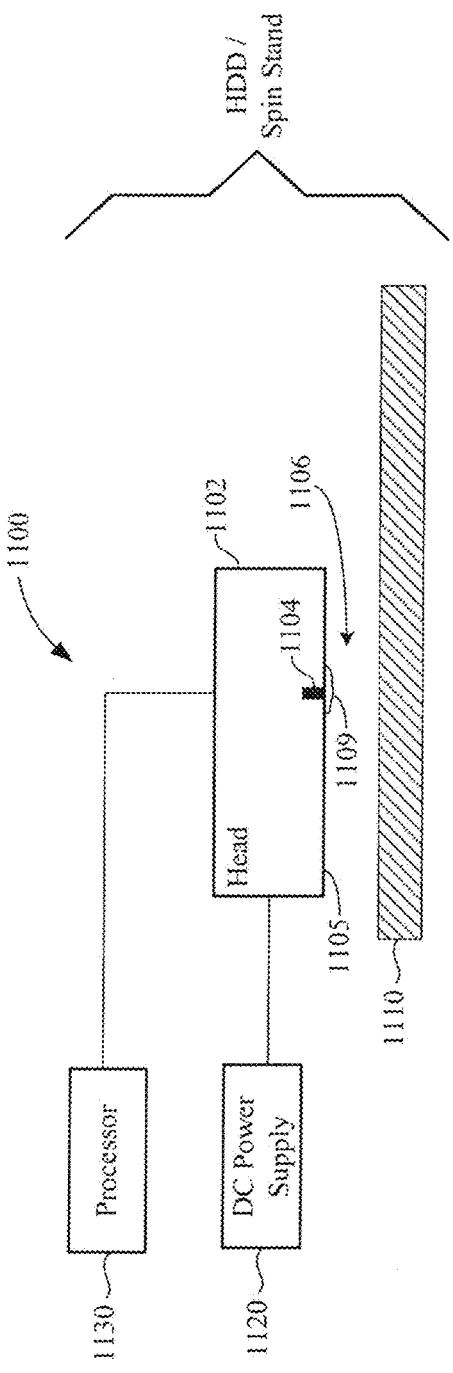
FIG. 11 is a block diagram of a system for assessing contaminant accumulation at a head-disk interface in accordance with various embodiments.

FIG. 11 is a block diagram of a system 1100 for assessing contaminant accumulation at a head-disk interface in accordance with various embodiments. The system 1100 shown in FIG. 11 can be implemented in a hard drive or in a spin stand tester. The embodiment illustrated in FIG. 11 is directed to a technique that involves sweeping of DC power supplied to a thermal sensor and measuring resistance changes at each of a multiplicity of DC power levels. The system 1100 shown in FIG. 11 includes the transducer 1102 and a thermal sensor 1104 situated on an air bearing surface 1105 of the transducer 1102. The transducer 1102 is positioned in a spaced-apart relationship with respect to a magnetic disk of 1110, with a head-disk interface 1106 defined therebetween. The thermal sensor 1104 is positioned at a location on the ABS 1105 where accumulation of contaminants 1109 is likely to occur or is of interest to monitor. A DC power supply 1120 is coupled to the thermal sensor 1104 and is configured to supply DC power to the thermal sensor 1104 at various power levels. A processor 1130 is also coupled to the thermal sensor 1104.

Figure 12:
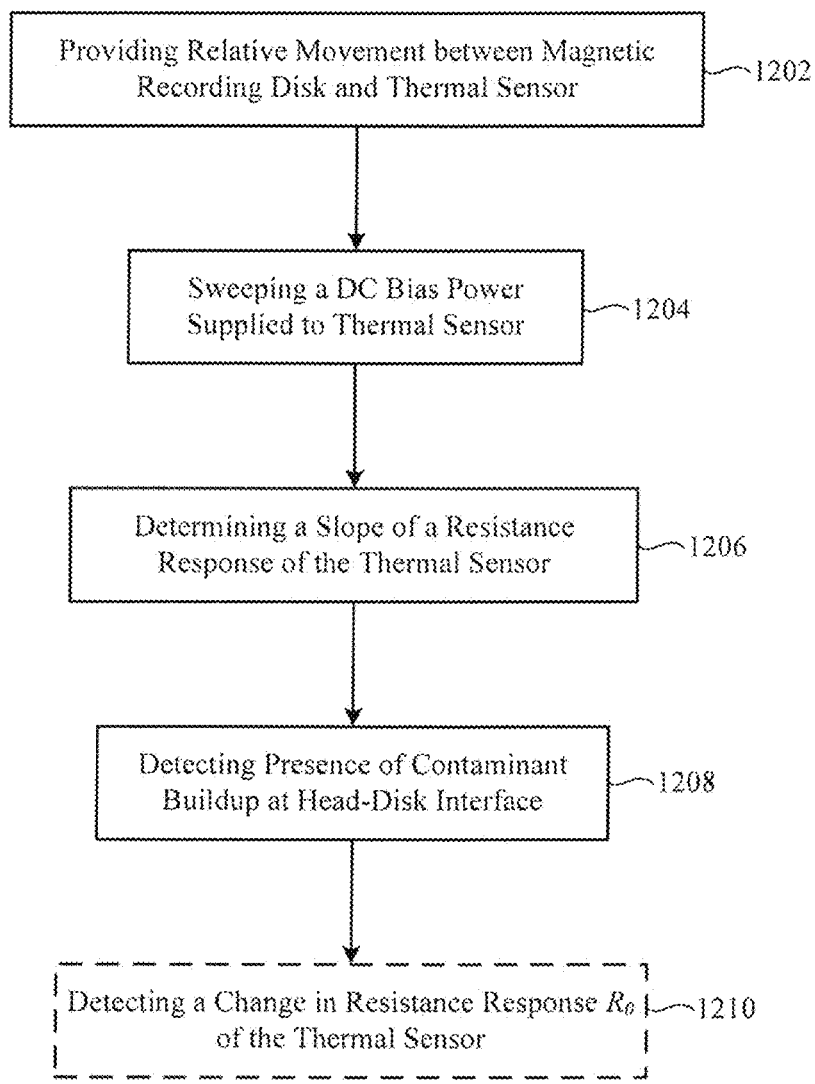
FIG. 12 is a flow chart illustrating various processes implemented by the system illustrated in FIG. 11 in accordance with various embodiments.

FIG. 12 is a flow chart illustrating various processes implemented by the system illustrated in FIG. 11 in accordance with various embodiments. The methodology illustrated in FIG. 12 involves providing 1202 relative movement between the disk magnetic recording disk 1110 and the thermal sensor 1104. The methodology involves sweeping 1204 DC power supplied by the DC power supply 1122 to the thermal sensor 1104. The processor 1130 is configured to measure sensor resistance and determine 1206 a slope of a resistance response of the thermal sensor 1104. The processor 1130 is also configured to detect 1208 presence of contaminant buildup 1109 at the head disk interface 1106. An alert signal or other response can be generated by the processor 1130 in response to detecting the contaminant buildup beyond a predetermined threshold. The methodology illustrated in FIG. 12 may further involve detecting 1210 a change in the resistance response, $R_0$, of the thermal sensor 1104. As was discussed previously, a change in the resistance response at zero bias power indicates a change in thermal environment (e.g., an increase or decrease in ambient temperature) or functional status (e.g., damage) of the thermal sensor 1104.

In some embodiments, the thermal sensor 1104 is implemented on the transducer 1102 as a wire formed of a material having a temperature coefficient of resistance (TCR). The wire 1104 is used to measure the thermal conduction in the head-disk interface 1106 to assess the presence of buildup or contamination 1109. As was discussed previously, according to a DC assessment approach, the heat sinking between the transducer 1102 and the disk 1110 can be determined by sweeping the bias power on the wire 1104 from low to high. The slope of the resistance response, or the bias sensitivity, of the wire 1104 will decrease with increasing heat sinking to the disk 1106.

According to some embodiments, existing thermal sensors (e.g., one or more DETCRs) in the recording head 1102 can be used to monitor accumulation and contamination. The thermal sensors can be located near the NFT and also near the reader. If the thermal sensors are electrically separate, the sensors can be used to detect accumulation near the NFT and near the reader. In some embodiments, multiple thermal sensors can be electrically independent from one another, while in other embodiments two or more thermal sensors can be electrically coupled (e.g., connected or joined), such as in series or parallel.

According to some DC biasing approaches, the resistance response of a thermal sensor can be measured at passive (i.e., slider heater inactive) clearance by sweeping a DC voltage bias on the thermal sensor within reasonable ranges, such that the thermal sensor state is not changed. From this thermal sensor response, the value of $R_0$, which is the resistance of the thermal sensor with no bias applied, can be calculated in a manner discussed previously. Once $R_0$ has been measured for a given head, thermal sensor resistance can be monitored at a set thermal sensor DC voltage bias for a given active (i.e., slider heater active) clearance that does not change the state of the thermal sensor (which can be realized through any detected changes to $R_0$ as previously discussed). Any decrease in thermal sensor resistance can be attributed to a change in heating sinking at the head-disk interface. This change in thermal sensor resistance due to heat sinking can be attributed to accumulation and contamination on the thermal sensor.

By monitoring the calibrated thermal sensor resistance for a given DC voltage bias, accumulation and contamination can be detected and monitored on the air bearing surface 1105. Monitoring the thermal sensor 1104 for accumulation and contamination 1109 can be realized via real-time testing during component testing on the spin stand or in-drive during the lifetime of the product. This accumulation and contamination monitoring technique can be realized for HAMR to monitor buildup around the NFT, observe head-disk interface events, and to predict performance and reliability of the recording heads.

Figure 13:
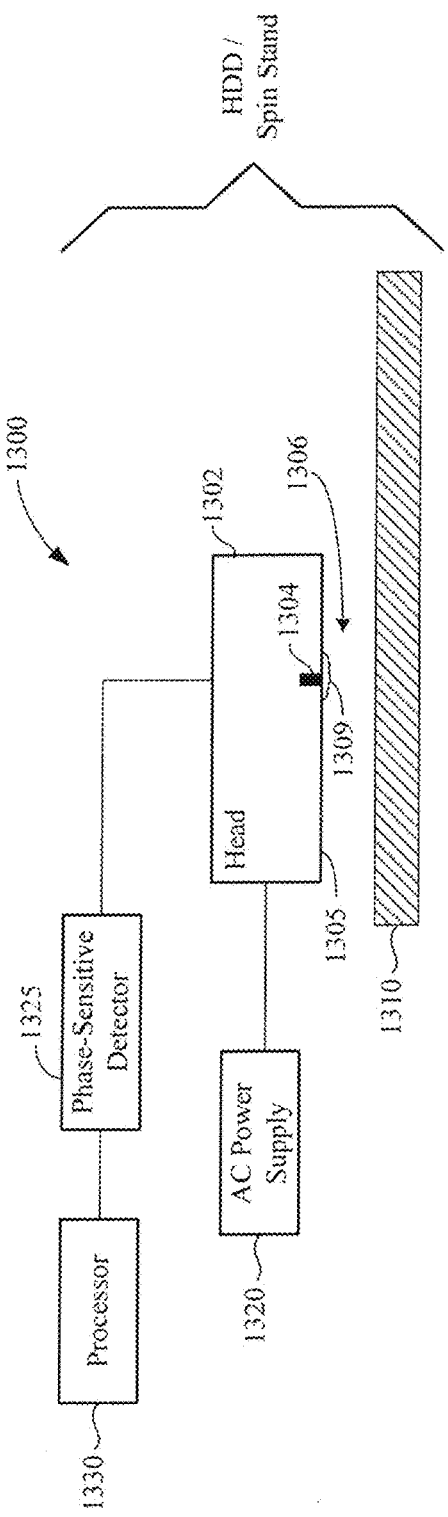
FIG. 13 is a block diagram of a system for assessing contaminant accumulation at a head-disk interface in accordance with various embodiments.

FIG. 13 is a block diagram of a system 1300 for assessing contaminant accumulation at a head-disk interface in accordance with various embodiments. The system 1300 shown in FIG. 13 can be implemented in a hard drive or in a spin stand tester. The embodiment illustrated in FIG. 13 is directed to a technique that involves supplying AC bias power at a predetermined frequency to a thermal sensor and measuring the bias sensitivity of the thermal sensor. Detected changes in sensor bias sensitivity in the absence of a change in $R_0$ indicates the presence of contaminant buildup in the head-disk interface. It is noted that the value of $R_0$ can be determined for each cycle of AC bias power, thereby allowing for continuous real-time monitoring of both changes in bias sensitivity and $R_0$ of the thermal sensor.

The system 1300 shown in FIG. 13 includes the transducer 1302 and a thermal sensor 1304 situated on an air bearing surface 1305 of the transducer 1302. The transducer 1302 is positioned in a spaced-apart relationship with respect to a magnetic disk of 1310, with a head-disk interface 1306 defined therebetween. The thermal sensor 1304 is positioned at a location on the ABS 1305 where accumulation of contaminants 1309 is likely to occur or is of interest to monitor. An AC power supply 1320 is coupled to the thermal sensor 1304 and is configured to supply AC power at a predetermined frequency to the thermal sensor 1304. A phase-sensitive detector 1325, such as a lock-in amplifier, is coupled to the thermal sensor 1304, and a processor 1330 is coupled to the phase-sensitive detector 1325.

Figure 14:
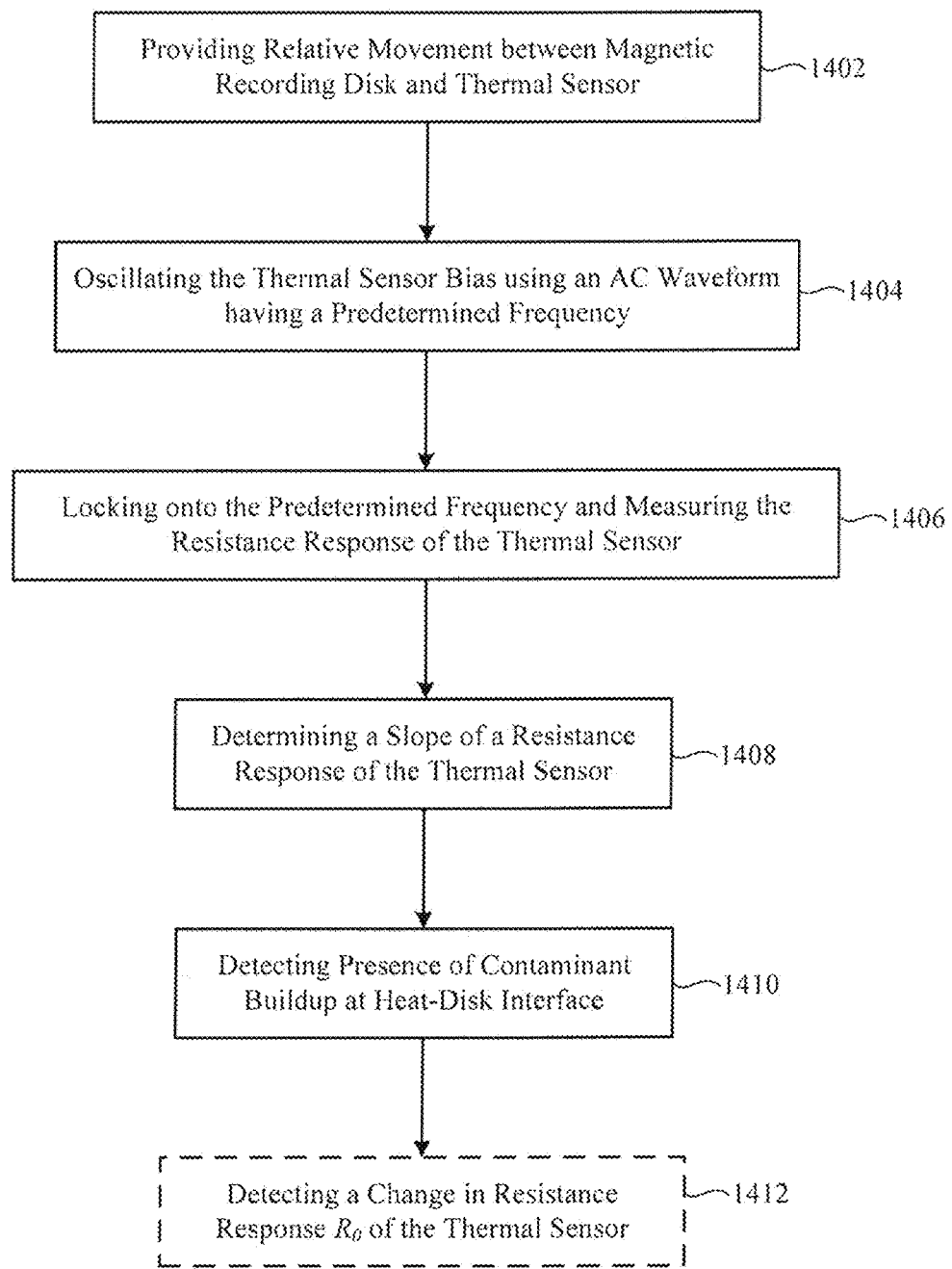
FIG. 14 is a flow chart illustrating various processes implemented by the system illustrated in FIG. 13 in accordance with various embodiments.

FIG. 14 is a flow chart illustrating various processes implemented by the system illustrated in FIG. 13 in accordance with various embodiments. The methodology illustrated in FIG. 14 involves providing 1402 relative movement between the magnetic recording disk 1310 and the thermal sensor 1304. The methodology involves oscillating 1404 the thermal sensor bias using an AC waveform having a predetermined frequency. The methodology further involves locking 1406 onto the predetermined frequency via the phase-sensitive detector 1325, and measuring the resistance response of the thermal sensor 1304. Measuring the resistance response of the thermal sensor 1304 involves measuring current and voltage changes and determining changes in applied power and thermal sensor resistance changes. The processor 1330 is configured to determine 1408 a slope of a resistance response of the thermal sensor 1304. The processor 1330 is also configured to detect 1410 presence of contaminant buildup 1309 at the head-disk interface 1306. An alert signal or other response can be generated by the processor 1330 in response to detecting the contaminant buildup beyond a predetermined threshold. The methodology illustrated in FIG. 14 may further involve detecting 1412 a change in the resistance response, $R_0$, of the thermal sensor 1304, which is indicative of a change in the thermal environment (e.g., an increase or decrease in ambient temperature) or functional status (e.g., damage) of the thermal sensor 1304.

A significant contributor to buildup or accumulation of contaminants at a HAMR ABS is laser heating. Solid contaminants from the magnetic medium and/or the head are produced as a result of elevated local temperatures generated by firing the laser of the HAMR head. FIGS. 15-17 are plots describing thermal sensor behavior due to laser-induced contamination in the head-disk interface of a HAMR head.

Figure 15A:
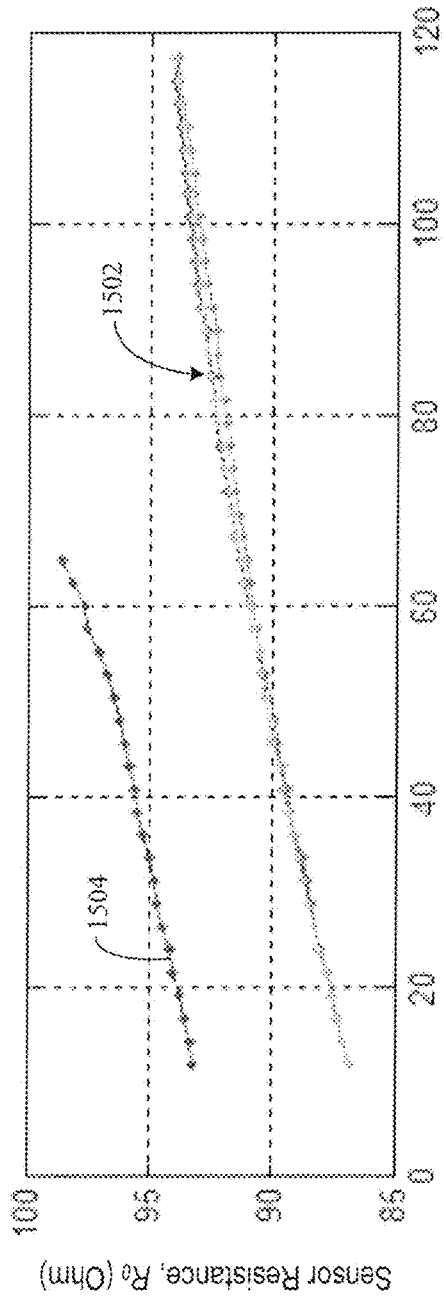
FIGS. 15A-15B and 16 show the impact of buildup or accumulation on the signal of a thermal sensor of a HAMR head in accordance with various embodiments.
Figure 15B:
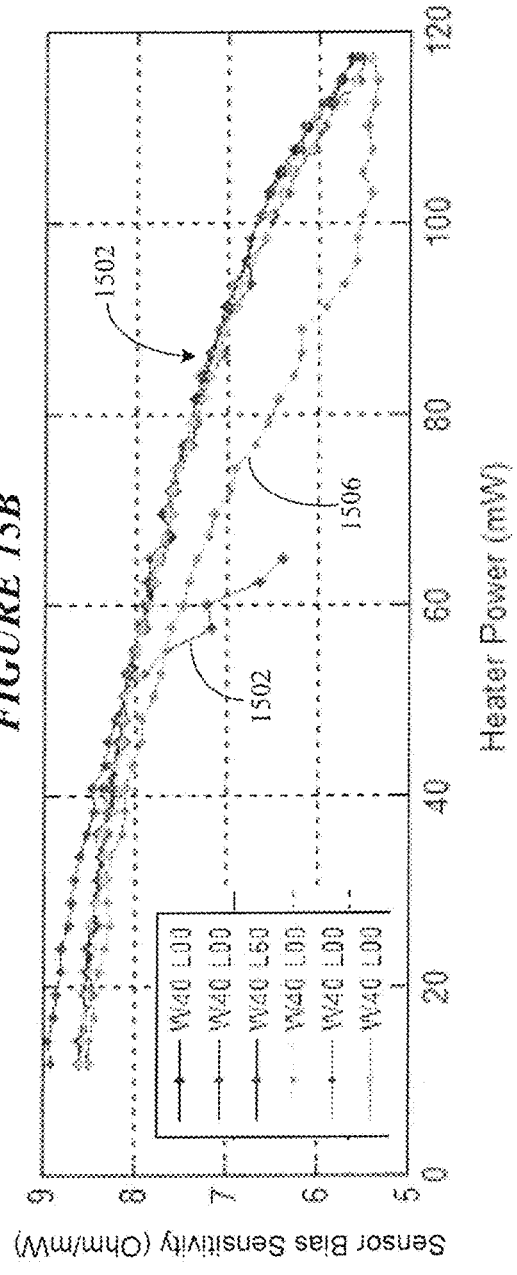
Figure 16:
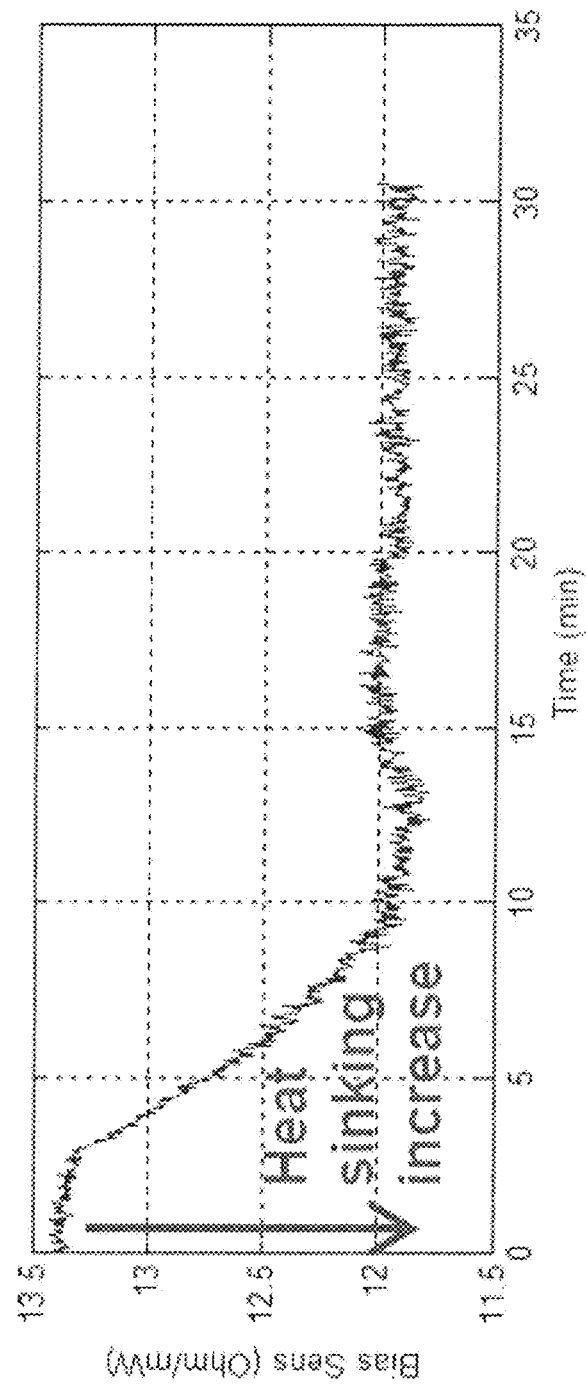
Figure 17A:
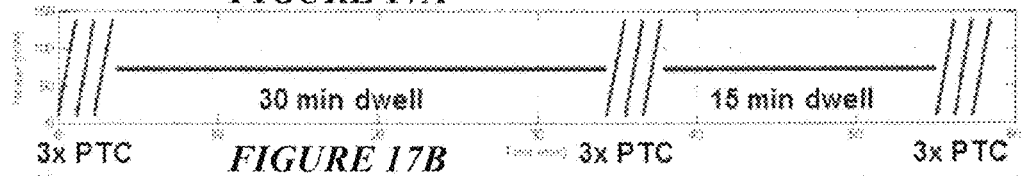
FIGS. 17A-17D show an example of removing the buildup at a head-disk interface by performing a contact detection according to various embodiments.
Figure 17B:
Figure 17C:
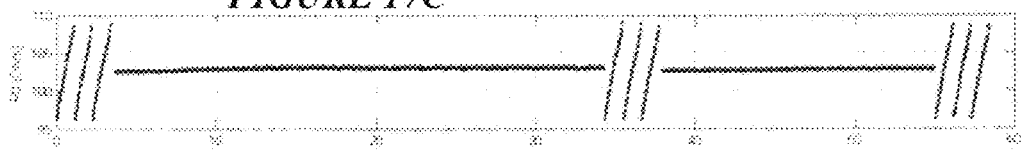
Figure 17D:
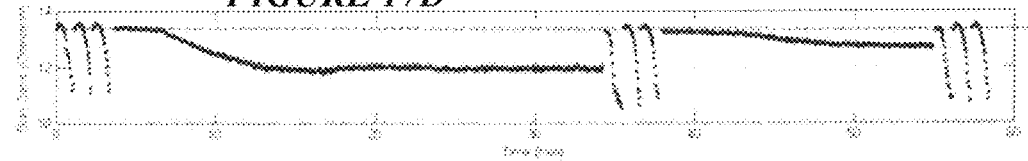

FIGS. 15A and 15B show the impact of buildup or accumulation on the signal of a thermal sensor of a HAMR head in accordance with various embodiments. FIGS. 15A and 15B show data plots for a number of tests performed using the same head and same thermal sensor. Selected plots are identified by reference number for simplicity of explanation. FIGS. 15A and 15B illustrate the bias response of a thermal sensor as a function of heat actuator power (slider heater power).

Bias sensitivity was measured while sweeping the heat actuator (slider heater) until contact between the head and disk occurred. The head was first swept to make disk contact twice to determine a baseline curve. The laser was then turned on and the head was again swept to contact. For this head-disk interface, some buildup on the head occurred. The laser was then turned off and the head sweep again to contact once more. This time the bias sensitivity was lower than the baseline. This indicated buildup was present in the head-disk interface and was providing a thermal path to the disk. When the head was brought into contact additional times, it was seen that the bias sensitivity returned to and remained at the baseline. This confirms that the buildup had been removed from the interface because of contact with the disk during the contact detections.

Referring again to FIGS. 15A and 15B, test results are shown for six sweeps that produced contact between the head and disk near the close-point. The order of testing was: first, two sweeps with the laser off (subsumed in plots 1502), then once with the laser on (plot 1504), then three times with the laser off (subsumed in plots 1502). It can be seen that the bias sensitivity drops for the first trace after the laser was turned on (plot 1506). This is an indication of buildup in the head-disk interface. The last two sweeps (subsumed in plots 1502) result in data similar to that of the original response, indicating the buildup has been removed due to head-disk contact.

An alternate embodiment of this technique involves holding the head clearance fixed and measuring the bias sensitivity as a function of time, which is shown in FIG. 16. In this case, all parameters of the head (including the laser current) were held fixed during a dwell for 30 minutes. Clearance was set halfway to contact. The decrease in the bias sensitivity under these conditions indicates contaminant buildup at the thermal sensor, which reaches steady state after around 10 minutes. In other words, the head-disk interface at the thermal sensor position was completely filled with contaminants after 10 minutes of dwell time with the laser on. A threshold can be set on this drop in the thermal sensor signal to trigger a corrective action in order to address the presence of buildup.

Figure 18:
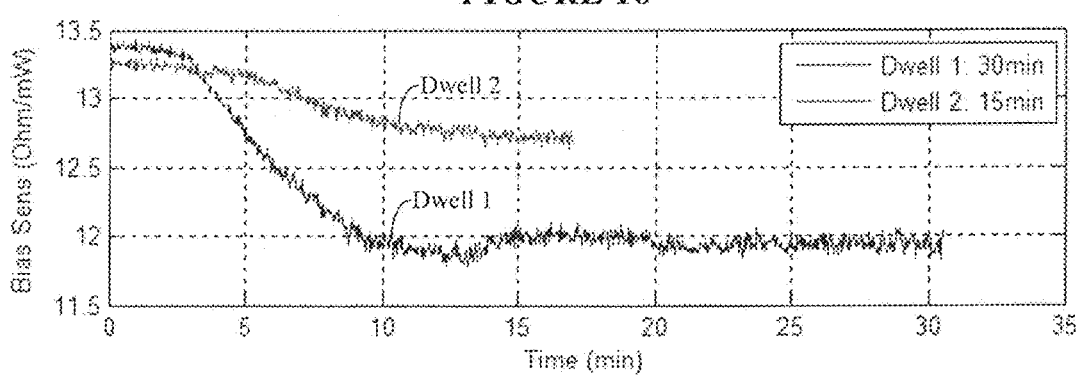
FIG. 18 provides a comparison of bias sensitivity measurements of the thermal sensor during the two dwells shown in FIGS. 17A-17D.

FIGS. 17 and 18 show an example of removing the buildup in a head-disk interface by performing a contact detection. FIGS. 17A-17D show data when using the sensor to detect buildup in a HAMR head-disk interface and then confirming that the buildup has been cleaned away. FIG. 17A shows heater power data, FIG. 17B shows friction data, FIG. 17C shows thermal sensor resistance, $R_0$, data, and FIG. 17D shows thermal sensor bias sensitivity data for the experiment. The vertical lines in FIG. 17 indicate head-disk contact events. In this illustrative example, the laser was powered on for the duration of the experiment. Buildup was generated during the first 30 minutes of dwell at the same track on the disk and with the same laser power. The buildup was removed by performing a contact detection. The buildup was then regenerated during the second dwell of 15 minutes. FIG. 18 provides a comparison of bias sensitivity measurements of the thermal sensor during the two dwells shown in FIG. 17. The bias sensitivity returned to its original value after the contact detection, confirming the buildup was removed as a result of the contact detection.

For a given interface design, a transfer function can be developed between the magnitude of the buildup with the decrease in bias sensitivity. If the measured build up is determined to exceed a predetermined level, then corrective action can be taken to remove the contamination in the interface or adjust the drive operation to account for it. Such an algorithm is shown in FIG. 19. According the embodiment shown in FIG. 19, the head-disk interface conditions for the contaminant accumulation test are selected and set 1902. The test involves measuring 1904 the bias sensitivity, s, of the thermal sensor to determine its initial value. A period of time elapses 1906 until a subsequent bias sensitivity measurement is made. This time period may be a predetermined duration or established or adjusted/interrupted based on drive performance or conditions. Prior to performing a subsequent bias sensitivity measurement, the head-disk interface conditions are selected and set 1908, preferably to those of the initial measurement 1902. This will provide for a value of sensor resistance $R_0$ that is the same or nearly the same for a number of time-separated bias sensitivity measurements.

The bias sensitivity, s, is measured 1910 and compared to the initial value determined at block 1904. A check is made to determine if the change in bias sensitivity, s, exceeds a predetermined threshold, which may be a percentage change, a standard deviation (e.g., 2 or 3 sigma), or a numerical value. If the bias sensitivity, s, does not exceed the predetermined threshold, processing returns to block 1906, in which case a time period elapses before the next bias sensitivity measurement. If the bias sensitivity, s, exceeds the predetermined threshold, corrective action is taken 1914 to address the presence of contaminant buildup in the head-disk interface.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A method, comprising:
   providing relative movement between a magnetic recording disk and a thermal sensor, a head-disk interface defined between the disk and the thermal sensor;
   supplying a bias power to the thermal sensor between a low power and a high power;
   determining a slope of a resistance response of the thermal sensor;
   calculating a resistance response $R_0$ as a resistance of the thermal sensor with no bias power supplied to the thermal sensor; and
   detecting presence of contaminant buildup at the head-disk interface in response to detecting a change in the slope relative to a baseline slope with no concurrent change in $R_0$ relative to a baseline $R_0$.

2. The method of claim 1, wherein a decrease in the slope relative to the baseline indicates increased heat sinking between the thermal sensor and the disk due to the presence of contaminant buildup at the head-disk interface.

3. The method of claim 1, wherein the change in $R_0$ is indicative of a change in external heating or condition of the thermal sensor.

4. The method of claim 1, wherein detecting the slope change comprises:
   setting the bias power of the thermal sensor to a predetermined level; and
   measuring a change in the resistance response of the thermal sensor while at the predetermined bias power level;
   wherein the measured change with no concurrent change in $R_0$ is indicative of the presence of contaminant buildup at the head-disk interface.

5. The method of claim 1, further comprising:
   measuring the change in the resistance response $R_0$; and
   generating a signal in response to the measured change in the resistance response $R_0$.

6. The method of claim 1, wherein the bias power is a DC bias power.

7. The method of claim 1, wherein the bias power is an AC bias power having a predetermined frequency.

8. The method of claim 7, further comprising locking onto the predetermined frequency to determine the resistance response of the thermal sensor.

9. The method of claim 7, wherein the predetermined frequency ranges from about 50 Hz to about 500 kHz.

10. An apparatus, comprising:
    a thermal sensor configured to interact with a magnetic recording disk;
    a head-disk interface defined between the thermal sensor and the disk;
    a power supply coupled to the thermal sensor and configured to supply a bias power to the thermal sensor between a low power and a high power; and
    a processor coupled to the thermal sensor and configured to determine a slope of a resistance response of the thermal sensor and calculate a resistance response $R_0$ as a resistance of the thermal sensor with no bias power supplied to the thermal sensor, the processor further configured to detect a change in the slope relative to a baseline slope and a change in $R_0$ relative to a baseline $R_0$;
    wherein the slope change with no concurrent change in $R_0$ indicates increased heat sinking between the thermal sensor and the disk due to the presence of contaminant buildup at the head-disk interface.

11. The apparatus of claim 10, wherein the slope change is a decrease in the slope relative to the baseline.

12. The apparatus of claim 10, wherein the processor is further configured to detect a change in external heating or condition of the thermal sensor in response to detecting the change in $R_0$.

13. The apparatus of claim 10, wherein the processor is further configured to:
    set the bias power of the thermal sensor to a predetermined level; and
    measure a change in the resistance response of the thermal sensor while at the predetermined bias power level, wherein the measured change is indicative of the presence of contaminant buildup at the head-disk interface.

14. The apparatus of claim 10, wherein the processor is further configured to:
    measure the change in the resistance response $R_0$; and
    generate a signal in response to the measured change in the resistance response $R_0$.

15. The apparatus of claim 10, wherein the bias power is a DC bias power.

16. The apparatus of claim 10, wherein the bias power is an AC bias power having a predetermined frequency.

17. The apparatus of claim 16, further comprising a phase sensitive detector configured to lock on to the predetermined frequency of the thermal sensor.

18. The apparatus of claim 17, wherein the predetermined frequency ranges from about 50 Hz to about 500 kHz.

19. The apparatus of claim 10, wherein the apparatus is implemented in a hard disk drive.

20. The apparatus of claim 10, wherein the apparatus is implemented in a spin stand testing system.

21. The apparatus of claim 10, further comprising a recording head having a slider, wherein the thermal sensor is supported on the slider of the recording head.

22. The apparatus of claim 21, wherein the recording head is configured for heat-assisted magnetic recording.

* * * * *